(12) United States Patent
Du et al.

(10) Patent No.: US 11,265,797 B2
(45) Date of Patent: Mar. 1, 2022

(54) DEPTH AND DISTANCE-BASED SINGLE-PATH ROUTING METHOD

(71) Applicant: Qinghai Normal University, Qinghai (CN)

(72) Inventors: Xiujuan Du, Qinghai (CN); Chong Li, Qinghai (CN); Lijuan Wang, Qinghai (CN)

(73) Assignee: Qinghai Normal University, Xining (CN)

( * ) Notice: Subject to any disclaimer, the term of this patent is extended or adjusted under 35 U.S.C. 154(b) by 0 days.

(21) Appl. No.: 17/011,978

(22) Filed: Sep. 3, 2020

(65) Prior Publication Data

US 2021/0153097 A1 May 20, 2021

(30) Foreign Application Priority Data

Nov. 20, 2019 (CN) .......................... 201911144179.7

(51) Int. Cl.
*H04W 40/08* (2009.01)
*H04W 40/10* (2009.01)
*H04W 40/20* (2009.01)
*H04W 40/38* (2009.01)

(52) U.S. Cl.
CPC ........... *H04W 40/08* (2013.01); *H04W 40/10* (2013.01); *H04W 40/20* (2013.01); *H04W 40/38* (2013.01)

(58) Field of Classification Search
None
See application file for complete search history.

(56) References Cited

U.S. PATENT DOCUMENTS

2011/0051645 A1* 3/2011 Hong .................. H04W 40/005
370/311
2018/0302172 A1 10/2018 Petrioli et al.

FOREIGN PATENT DOCUMENTS

CN 102572955 A 7/2012
CN 103209224 A 7/2013

OTHER PUBLICATIONS

T. Ahmed, M. Chaudhary, M. Kaleem and S. Nazir, "Optimized depth-based routing protocol for underwater wireless sensor networks," 2016 International Conference on Open Source Systems & Technologies (ICOSST), 2016, pp. 147-150, doi: 10.1109/ICOSST.2016.7838592. (Year: 2016).*

(Continued)

*Primary Examiner* — Brian S Roberts (57) ABSTRACT

A depth and distance-based single-path routing method, in which location information of nodes in network is gathered after initialization is completed, and a location table of whole-network nodes maintained by the sink node is generated. The update mechanism of the uplink Location frame is switched to a unicast triggering update mechanism to execute a depth and energy-based uplink routing algorithm. For a downlink control packet arriving at a specified ID, location information of a node is obtained through the location table to execute a distance and energy-based downlink routing policy. The distance and energy-based downlink routing policy for a downlink control packet arriving at a specified location and a downlink control packet arriving at the specified ID is executed, and a routing recovery algorithm is executed when an "open area" occurs.

6 Claims, 7 Drawing Sheets

(56) References Cited

OTHER PUBLICATIONS

Liu Guangzhong and Li Zhibin, "Depth-Based Multi-hop Routing protocol for Underwater Sensor Network," 2010 The 2nd International Conference on Industrial Mechatronics and Automation, 2010, pp. 268-270, doi: 10.1109/ICINDMA.2010.5538317. (Year: 2010).*

T. Khan et al., "Clustering Depth Based Routing for Underwater Wireless Sensor Networks," 2016 IEEE 30th International Conference on Advanced Information Networking and Applications (AINA), 2016, pp. 506-515, doi: 10.1109/AINA.2016.168. (Year: 2016).*

Kang Wenjing et al. A Novel 3-dimension Routing Algorithm for Underwater Sensor Networks Based on Depth and Distance Sensing, Dec. 2011, No. 35, vol. 11.

* cited by examiner

FIG. 13 ical Field

DEPTH AND DISTANCE-BASED SINGLE-PATH ROUTING METHOD

CROSS-REFERENCE TO RELATED APPLICATIONS

This application claims the benefit of priority from Chinese Patent Application No. 201911144179.7, filed on Nov. 20, 2019. The content of the aforementioned application, including any intervening amendments thereto, is incorporated herein by reference in its entirety.

TECHNICAL FIELD

The present application relates to network communication, and more particularly to a depth and distance-based single-path routing (DDSPR) method.

BACKGROUND

Different from terrestrial wireless sensor networks (WSNs), the underwater wireless sensor networks will suffer gradual attenuation in the intensity of electromagnetic waves during the transmission since water can greatly absorb the electromagnetic signals, where the attenuation level is proportional to the frequency of electromagnetic waves. It has been reported that the electromagnetic waves following the IEEE protocol only have a propagation distance of approximately 50-100 cm underwater, and ultra-low frequency radio waves (30-300 Hz) using large receiving antennas have a propagation distance of approximately 100 m underwater, and will cause large energy consumption during the propagation, which is unacceptable for underwater sensor nodes with limited energy. Due to the above defects of electromagnetic waves, sound waves are usually adopted as information carriers in the underwater acoustic networks (UANs). However, the propagation delay of sound waves under the water is about 5 orders of magnitude higher than the propagation delay of electromagnetic waves in the air, and the underwater propagation speed of sound waves is greatly affected by the environment, resulting in significant temporal and spatial variation. Moreover, the sound waves are extremely susceptible to path loss, noise, multipath effect and Doppler effect during the underwater transmission, resulting in a higher error rate. Due to the influence of transmission range and modulation method, the bit error rate of underwater acoustic communication is $10^{-7}$-$10^{-3}$, and will rise as the transmission range increase. In addition, since the nodes in the UANs are usually powered by storage batteries and kept in the marine environment for a long period, it is very difficult to charge and replace the batteries. Compared to the WSNs modems, the UANs acoustic modems generally involve larger energy consumption, resulting in high cost for the underwater nodes with limited energy. Due to the low bandwidth, long delay, high bit error rate and energy limitation of the UANs, traditional WSNs routing protocols cannot be directly applied to the UANs effectively.

Considering the characteristics of the UANs, some routing protocols suitable for the UANs underwater have been proposed, such as Vector-Based Forwarding (VBF) and Depth-Based Routing (DBR). However, these protocols also have some problems. For example, in the VBF protocol, a routing vector from a data-forwarding node to the sink node is defined as a forwarding path, in which the data will experience flooding broadcast. The hold time is introduced to reduce redundant forwarding, which improves energy efficiency and reduces collision to a certain extent. In the DBR protocol, the routing decisions are performed based on the depth information of the nodes, which has a certain degree of dynamics. However, an "open area" may be easily formed in the DBR protocol because of the use of a greedy algorithm. In addition, both the VBF and the DBR adopt a broadcast forwarding mechanism with hold time, resulting in a large quantity of collisions, redundant forwarding and extra delay in the network.

SUMMARY

An object of the present disclosure is to solve the problems that the broadcast flooding is employed when the downlink control packet arriving at a specified ID performs routing; and an "open area" occurs during the execution of the distance-based routing policy, where the downlink control packet includes packets arriving at a specified location and packets arriving at a specified ID.

The technical solutions of the disclosure are described as follows.

The present disclosure provides a depth and distance-based single-path routing method, comprising:

(1) after initialization is completed, gathering location information of nodes in network to a sink node through the flooding of an uplink Location frame; storing the location information at the sink node to generate a location table of whole-network nodes; after the location table is generated, switching an update mechanism of the uplink Location frame to an unicast triggering update mechanism to execute a depth and energy-based uplink routing algorithm;

(2) for a downlink control packet arriving at a specified ID, obtaining, by the sink node, location information of a node at the specified ID through the location table to execute a distance and energy-based downlink routing policy; and (3) executing the distance and energy-based downlink routing policy for a downlink control packet arriving at a specified location and the downlink control packet arriving at the specified ID; and executing a routing recovery algorithm when an "open area" occurs.

In an embodiment, the location table is generated through steps of:

(1.1) flooding, by an end node, a Location frame containing location information of the end node to generated the location table in the sink node; and (1.2) switching the update mechanism of the uplink Location frame to the unicast triggering update mechanism.

In an embodiment, the unicast triggering update mechanism of the uplink Location frame comprises:

introducing, by an algorithm, a topology variation degree $P_{location}$ for each node; triggering the updating of the uplink Location frame when the topology variation degree $P_{location}$ exceeds a threshold; and forwarding the uplink Location frame hop-by-hop by a unicast method;

wherein the topology variation degree $P_{location}$ is calculated as follows:

$$P_{location} = \left|1 - \frac{Density_{cur}}{Density_{init}}\right| + \left(1 - \frac{Density_{remain}}{Density_{init}}\right);$$

wherein $Density_{init}$ is a neighbor density of a node after the last update; $Density_{cur}$ is a neighbor density of the node before the current update; $Density_{remain}$ is a neighbor density of a node whose ID does not change in a period between the last update and the current update; the smaller the $P_{location}$ is, the smaller the topology variation is;

a threshold $\partial$ is set for $P_{location}$ in the depth and distance-based single-path routing method, and if $P_{location} \leq \partial$ or $Dis_{locat} < R$, the update of the uplink Location frame is not triggered; if $P_{location} > \partial$ and $Dis_{locat} \geq R$, the update of the uplink Location frame update is triggered; wherein $Dis_{locat}$ is a traveling distance of the node in the period between the last update and the current update.

In an embodiment, the distance and energy-based downlink routing policy is described as follows:

a downlink control frame comprises a downlink control packet arriving at a location and a downlink control packet arriving at an ID; when the sink node receives the downlink control frame, a forwarding factor is calculated respectively using all candidate nodes as a forwarding node:

$$\alpha_{kid}^i = k_1 \frac{Dis_{cur} - Dis_i}{R} + k_2 \frac{AP_i}{\max\{AP_i\}},$$

and a node with the largest forwarding factor is selected as the optimal forwarding node;

wherein $k_1$, $k_2$ are weight coefficients, $k_1 + k_2 = 1$ and $k_1 < k_2$; $Dis_i$ is a distance from a child node $node_i$ to a destination node; $Dis_{cur}$ is a distance from a current node $node_{cur}$ to the destination node; $AP_i$ is a current remaining energy value of the child node $node_i$; $AP_{init}$ is an initial energy value of the child node; a node, which is closer to the destination node and has higher remaining energy, has greater forwarding probability, so that a node with the largest forwarding factor $\alpha_{kid}^i = \max\{\alpha_{kid}^i\}$ is selected as a node for the next hop to perform forwarding.

In an embodiment, the routing recovery algorithm is described as follows:

the "open area" will occur since only location information of an one-hop neighbor node is calculated in the distance and energy-based downlink routing policy; when the "open area" occurs, a neighbor node with the same level as a current node is selected as a candidate node $node_i$; and based on energy of each candidate node and a distance between each candidate node and a destination location, an expectation factor $\alpha_{Neb}^i$ for each candidate node is calculated as follows:

$$\alpha_{Neb}^i = \frac{\max\{Dis_i\} - Dis_i}{2R} + \frac{AP_i}{\sum AP_i};$$

wherein $AP_i$ is a remaining energy value of the candidate node $node_i$; a candidate node, which is closer to the destination location and has higher remaining energy, has greater expectation factor; in the routing recovery algorithm, a candidate node with the largest expectation factor $\alpha_{Neb}^i = \max\{\alpha_{Neb}^i\}$ is selected as the optimal forwarding node to which the downlink control frame is forwarded, and the downlink routing algorithm is continued by the candidate node with the largest expectation factor; in addition, in order to reduce unnecessary energy consumption, it is specified in the routing recovery algorithm that if it fails to reach a destination location after the forwarding is performed twice at the same level, the destination location is considered as an unreachable area and the forwarding of the downlink control frame is ended.

In an embodiment, the depth and energy-based uplink routing algorithm is described as follows:

for an uplink data frame and the uplink Location frame, a forwarding overhead of each candidate node is calculated based on depth and remaining energy as shown in the following formula:

$$\alpha_{depth}^i = \alpha_1 \frac{Dep_i - \min\{Dep_i\}}{\max\{Dep_i\} - \min\{Dep_i\}} + \alpha_2 \frac{AP_{init} - AP_i}{AP_{init}};$$

considering energy consumption and collision of nodes, an optimal candidate node is selected for next hop;

wherein $\alpha_1$, $\alpha_2$ are weight coefficients, and $\alpha_2 = 1 - \alpha_1$; $Dep_i$ is a depth of the candidate node $node_i$; $AP_i$ is a remaining energy value of the candidate node; a node, which has smaller depth and more remaining energy, has smaller forwarding overhead, and thus in the depth and energy-based uplink routing algorithm, a candidate node with the minimum forwarding overhead $\alpha_{depth}^i = \min\{\alpha_{depth}^i\}$ is selected as the optimal node for the next hop; therefore, a parent node with depth greater than the current node is allowed to be adopted for the next hop, thereby better solving the "open area" problem.

DETAILED DESCRIPTION OF EMBODIMENTS

Unless otherwise specified, the methods and devices used in the following embodiments of the present disclosure are conventional methods and devices; and the equipment and reagents used are all commercially available. In order to make object, technical solutions and advantages of the present disclosure clearer, the present disclosure will be further described in detail below with reference to the accompanying drawings and embodiments, and these embodiments are merely illustrative of the disclosure.

It should be noted that, in order to make the technical solutions of the present disclosure better understood, only the technical solutions and/or processing steps closely related to the present disclosure are shown in the embodiments.

Embodiment 1

The embodiment provides a depth and distance-based single-path routing method, including the following steps.

(1) After initialization is completed, location information of nodes in network is gathered to a sink node through the flooding of an uplink Location frame; the location information is stored at the sink node to generate a location table of entire network nodes; after the location table is generated, an update mechanism of the uplink Location frame is switched to an unicast triggering update mechanism to execute a depth and energy-based uplink routing algorithm.

(2) For a downlink control packet arriving at a specified ID, location information of a node through the location table is obtained by the sink node to execute a distance and energy-based downlink routing policy.

(3) The distance and energy-based downlink routing policy for a downlink control packet arriving at a specified location or the downlink control packet arriving at the specified ID is executed; and a routing recovery algorithm is executed when an "open area" occurs.

Embodiment 2

The embodiment provides a supplement of the depth and distance-based single-path routing method, including the following contents.

(1) The location table is generated through the following steps.

(1.1) A Location frame containing location information of the end node is flooded by an end node, to generate the location table in the sink node.

(1.2) The updated mechanism of the uplink Location frame is switched to the unicast triggering update mechanism.

(2) The unicast triggering update mechanism of the uplink Location frame is as follows.

A topology variation degree $P_{location}$ for each node is introduced. The updating of the uplink Location frame is triggered when the topology variation degree $P_{location}$ exceeds a threshold, and the uplink Location frame is forwarded hop-by-hop by the unicast method; where the topology variation degree $P_{location}$ is calculated as follows:

$$P_{location} = \left|1 - \frac{Density_{cur}}{Density_{init}}\right| + \left(1 - \frac{Density_{remain}}{Density_{init}}\right);$$

where $Density_{init}$ is a neighbor density of a node after the last update, $Density_{cur}$ is a neighbor density of the node before the current update; $Density_{remain}$ is a neighbor density of a node whose ID does not change in a period between the last update and the current update. It is known from the formula that the smaller the $P_{location}$ is, the smaller the topology variation is.

a threshold $\partial$ is set for the degree $P_{location}$ in the depth and distance-based single-path routing method, and if $P_{location} \leq \partial$ or $Dis_{local} < R$, the update of the uplink Location frame is not triggered; if $P_{location} > \partial$ and $Dis_{local} \geq R$, the update of the uplink Location frame update is triggered; wherein $Dis_{local}$ is a traveling distance of the node in the period between the last update and the current update.

(3) The distance and energy-based downlink routing policy is as follows.

A downlink control frame include a downlink control packet arriving at a location and a downlink control frame arriving at an ID; when the sink node receives the downlink control frame, a forwarding factor is calculated respectively using all candidate nodes as a forwarding node:

$$\alpha_{kid}^i = k_1 \frac{Dis_{cur} - Dis_i}{R} + k_2 \frac{AP_i}{\max\{AP_i\}},$$

and a node with the largest forwarding factor is selected as the optimal forwarding node.

$k_1$, $k_2$ are weight coefficients, $k_1 + k_2 = 1$ and $k_1 < k_2$; $Dis_i$ is a distance from a child node $node_i$ to a destination node; $Dis_{cur}$ is a distance from a current node $node_{cur}$ to the destination node; $AP_i$ is a current remaining energy value of the child node $node_i$; $AP_{init}$ is an initial energy value of the node; a node, which is closer to the destination node and has higher remaining energy, has greater forwarding probability, so that a node with the largest forwarding factor $\alpha_{kid}^i = \max\{\alpha_{kid}^i\}$ is selected as a node for the next hop to perform forwarding.

(4) The routing recovery algorithm is as follows.

Figure 1:
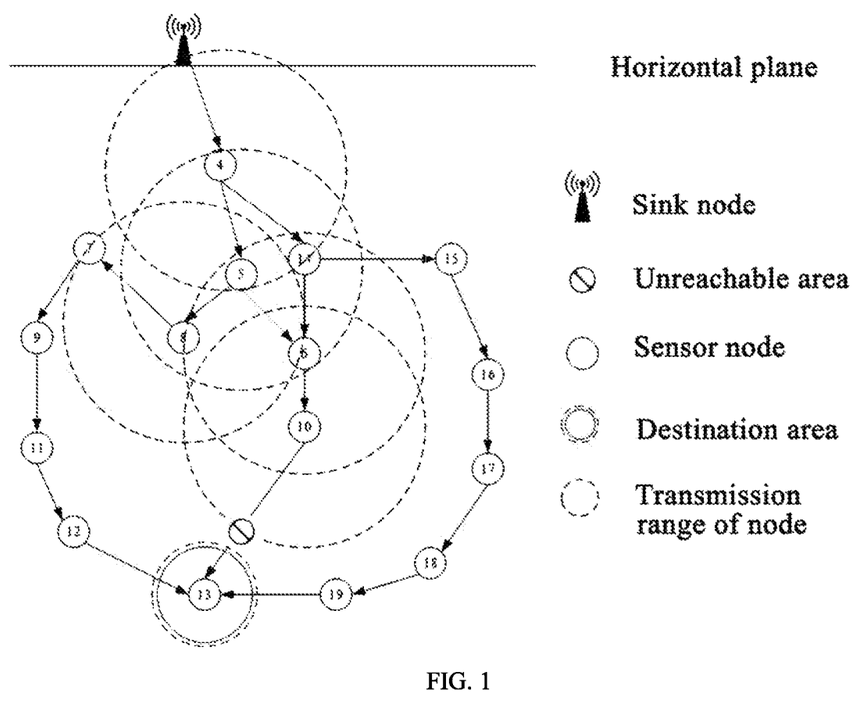
FIG. 1 schematically shows an "open area" according to an embodiment of the present disclosure.

As shown in FIG. 1, the "open area" will occur since only the location information of an one-hop neighbor node is calculated in the distance and energy-based downlink routing policy.

Figure 2:
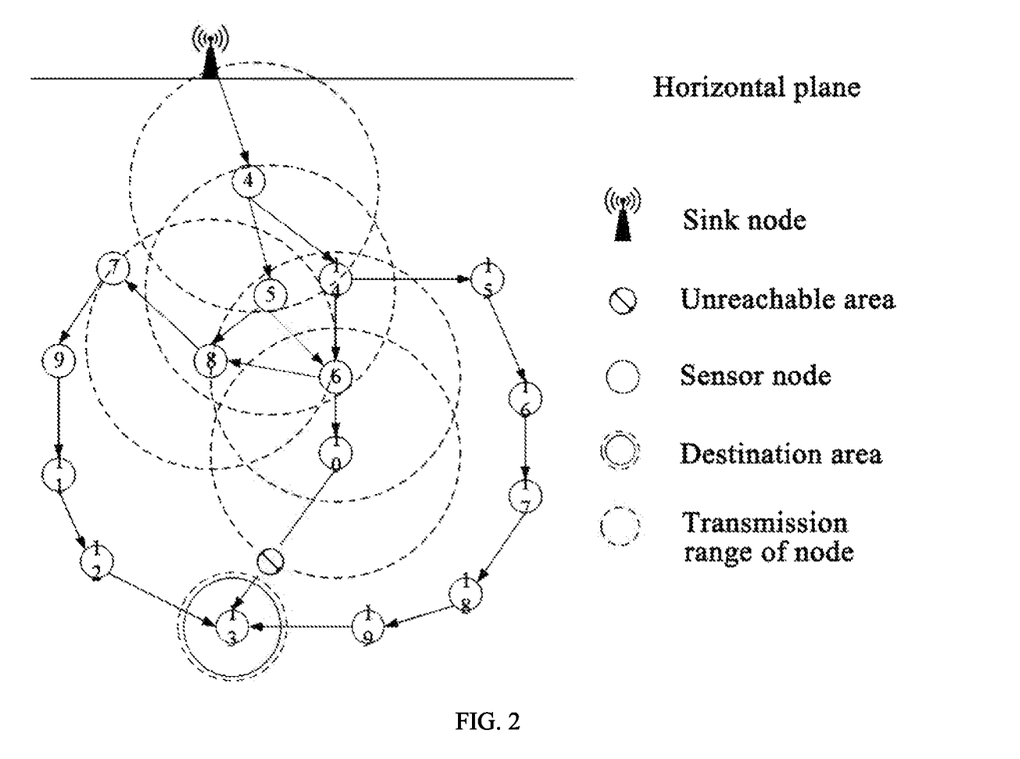
FIG. 2 is a schematic diagram of a selection mechanism of a routing recovery algorithm according to an embodiment of the present disclosure.
Figure 3:
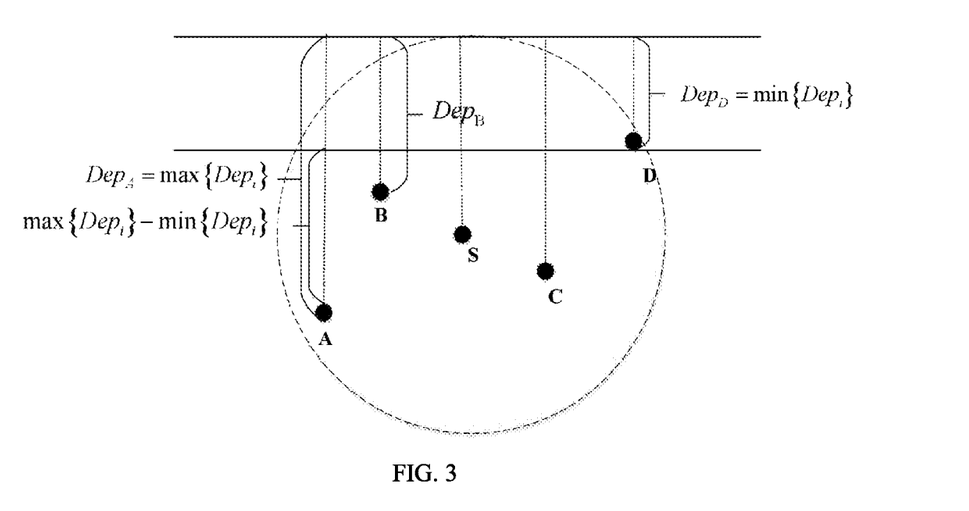
FIG. 3 is a schematic diagram of a routing mechanism of an uplink routing algorithm according to an embodiment of the present disclosure.

When the "open area" occurs, a neighbor node with the same level as a current node is selected as a candidate node $node_i$; and based on energy of each candidate node and a distance between each candidate and a destination location, an expectation factor $\alpha_{Neb}^i$ for each candidate node is calculated as follows:

$$\alpha_{Neb}^i = \frac{\max\{Dis_i\} - Dis_i}{2R} + \frac{AP_i}{\sum AP_i};$$

where $AP_i$ is a remaining energy value of the candidate node $node_i$; a candidate node, which is closer to the destination location and has higher remaining energy, has greater expectation factor. In the routing recovery algorithm, a candidate node with the largest expectation factor $\alpha_{Neb}^i = \max\{\alpha_{Neb}^i\}$ is selected as the optimal forwarding node to which the downlink control frame is forwarded, and the downlink routing algorithm is continued by the candidate node with the largest expectation factor. In addition, as shown in FIG. 2, in order to reduce unnecessary energy consumption, it is specified in the routing recovery algorithm that if it fails to reach a destination location after the forwarding is performed twice at the same level, the destination location is considered as an unreachable area and the forwarding of the downlink control frame is ended.

(5) The depth and energy-based uplink routing algorithm is as follows.

For an uplink data frame and the uplink Location frame, a forwarding overhead of each candidate node is calculated based on depth and remaining energy as shown in the following formula:

$$\alpha_{depth}^{i} = \alpha_1 \frac{Dep_i - \min\{Dep_i\}}{\max\{Dep_i\} - \min\{Dep_i\}} + \alpha_2 \frac{AP_{init} - AP_i}{AP_{init}};$$

considering energy consumption and collision of nodes, an optimal candidate node is selected for next hop.

$\alpha_1$, $\alpha_2$ are weight coefficients, and $\alpha_2=1-\alpha_1$; $Dep_i$ is a depth of the candidate node; $AP_i$ is a remaining energy value of the candidate node. A node which has smaller depth and more remaining energy, has smaller forwarding overhead. In the depth and energy-based uplink routing algorithm, a candidate node with the minimum forwarding overhead $\alpha_{depth}^{i}=\min\{\alpha_{depth}^{i}\}$ is selected as the optimal node for the next hop. Therefore, a parent node with greater depth than the current node is adopted for the next hop, thereby better solving the "open area" problem.

Embodiment 3

The embodiment provides a simulation experiment about an impact of the packet forwarding interval on the performance of the depth and distance-based single-path routing (DDSPR) method, where the experiment is conducted in a 3D area of 5000 m×5000 m×3000 m. Considering the area and the transmission radius of the nodes, 35 nodes are randomly distributed in the 3D area during the simulation experiment, and the simulation experiment is carried out at an interval of 20 s, 40 s, 60 s, 80 s, 100 s and 120 s, respectively.

Figure 4:
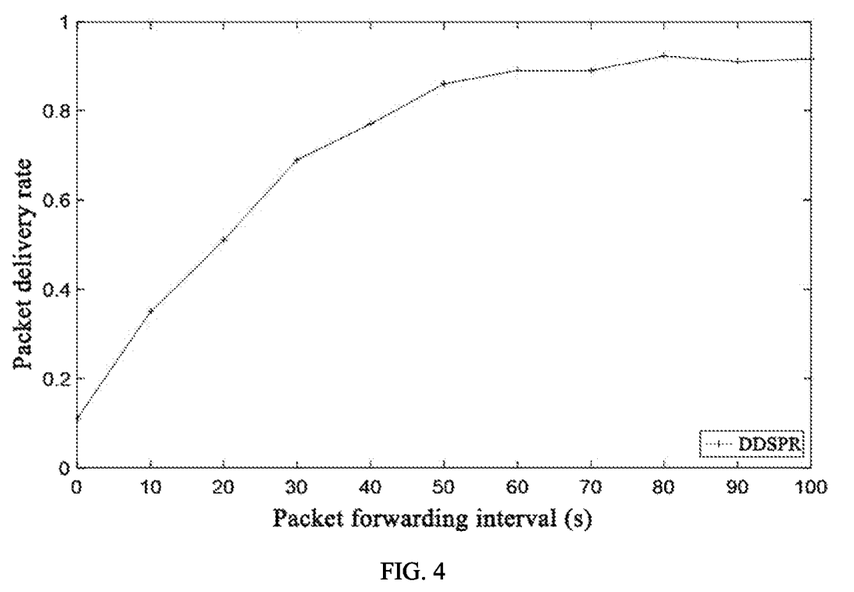
FIG. 4 illustrates a change trend of a packet delivery rate with a packet forwarding interval according to an embodiment of the present disclosure.

As shown in FIG. 4, at a shorter packet forwarding interval, the data transmission is performed extremely frequently, and excessive collisions occur in the network, resulting in relatively low packet delivery rate. As the packet forwarding interval increases, the collisions in the network decrease, and thus the delivery rate gradually increases. A packet delivery rate of about 90% can be reached at a packet forwarding interval of 80 s (FIG. 4).

Figure 5:
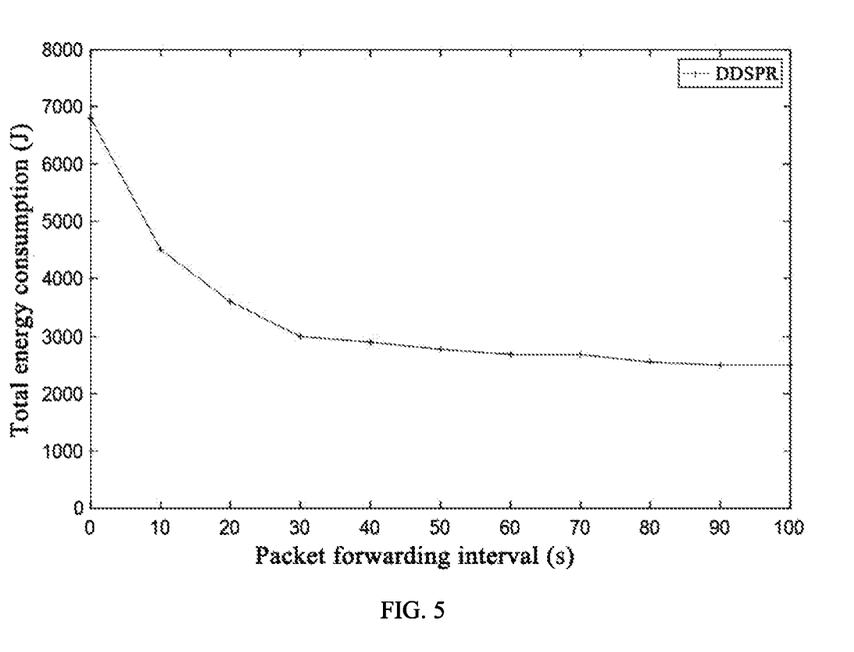
FIG. 5 illustrates a change trend of a total energy consumption of network with the packet forwarding interval according to an embodiment of the present disclosure.

As shown in FIG. 5, as the packet forwarding interval increases, the data packets gradually decrease, and collisions and the total energy consumption in the network are also gradually reduced. It can be concluded based on FIGS. 4-5 that in the same simulation time, a shorter packet forwarding interval will render the data transmission frequent, resulting in high occurrence rate of collisions in the network; a larger the packet sending interval will result in decrease in data frames and collisions in the network, but simultaneously render the network load smaller and the throughput lower.

Embodiment 4

The embodiment provides a comparison experiment between the DDSPR protocol and the DBR protocol in terms of packet delivery rate, average energy consumption and average end-to-end delay when a single data source node is stationary. A depth difference threshold of the DBR protocol is σ=2R/3, where R is the transmission radius. The experiment is performed in a 3D area of 5000 m×5000 m×3000 m, in which the nodes with a certain number such as 10, 15, 20, 25, 30, 35, 40 and 45 are randomly distributed, and the packet forwarding interval of the data source nodes is set at 80 s.

Figure 6:
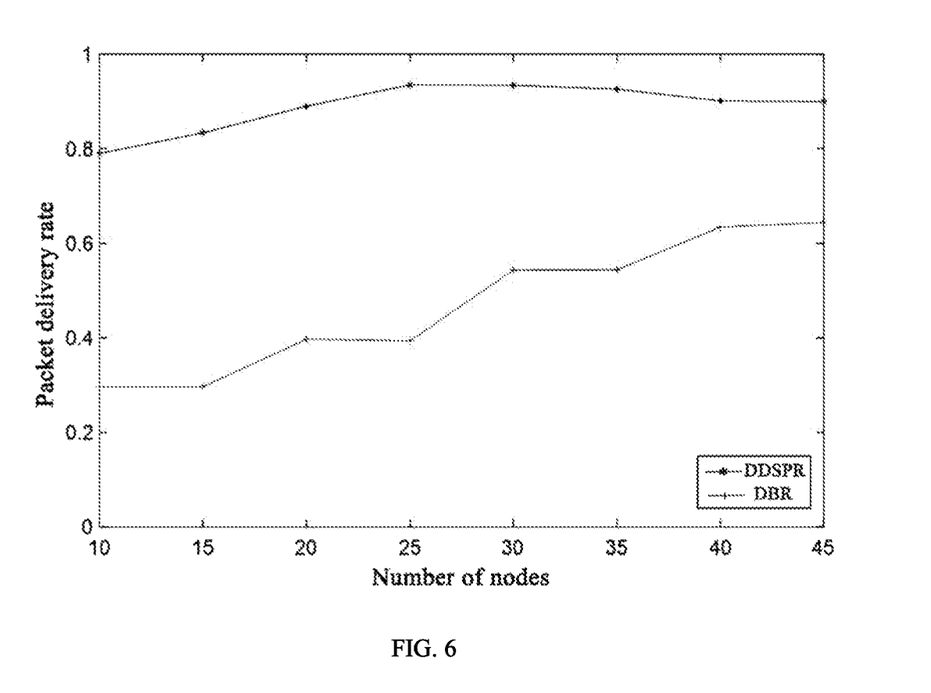
FIG. 6 illustrates a change trend of the packet delivery rate with the number of nodes according to an embodiment of the present disclosure.
Figure 7:
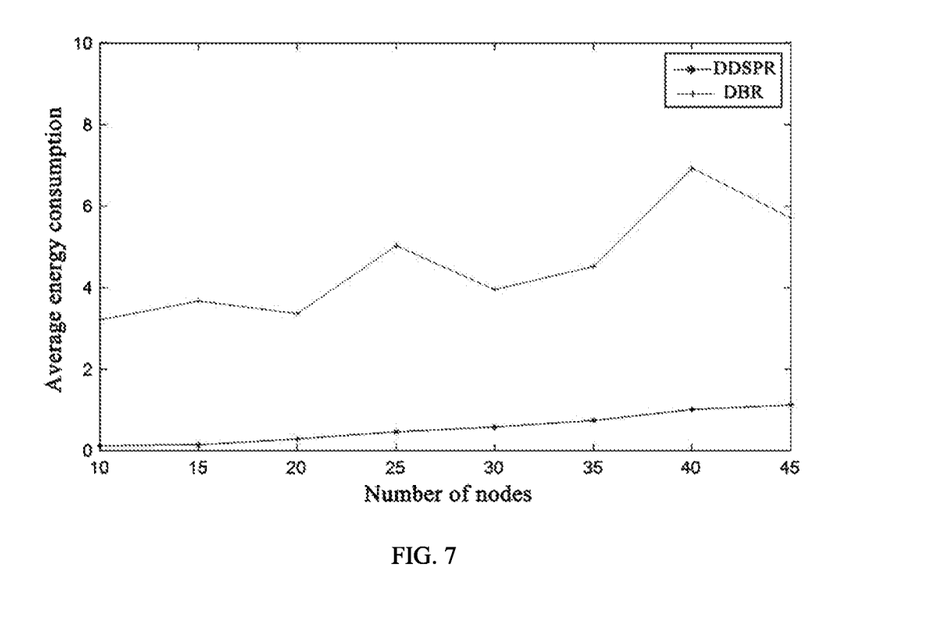
FIG. 7 illustrates a change trend of an average energy consumption with the number of nodes according to an embodiment of the present disclosure.
Figure 8:
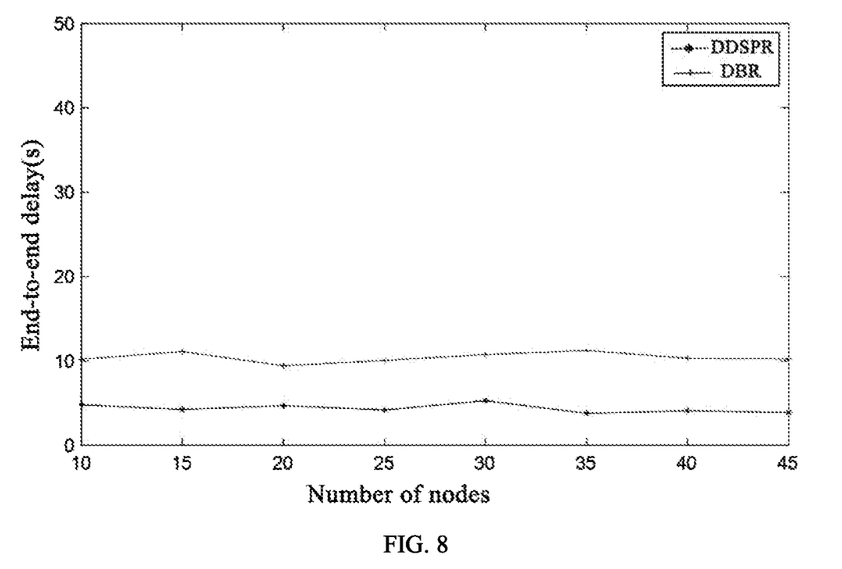
FIG. 8 illustrates a change trend of an average end-to-end delay with the number of nodes according to an embodiment of the present disclosure.

As shown in FIG. 6, due to the hierarchical mechanism in the DDSPR protocol, there is at least one upper node in the nodes in the network, so at least one feasible forwarding path can always be found for the forwarding node. As a result, the DDSPR protocol has a relatively high packet delivery rate (around 90%). On the contrary, due to the existence of "open area", data in the DBR protocol may fail to be continuously forwarded when sent to a certain area, resulting in relatively low packet delivery rate. With the increase of node density, the occurrence rate of the "open area" gradually decreases, so the packet delivery rate of the DBR protocol increases accordingly. As shown in FIG. 7, since the data in the DBR protocol is forwarded by broadcasting, that is, the same data packet may be repeatedly broadcasted and forwarded by different nodes, resulting in excessive redundant forwarding, the nodes generally have high energy consumption. In the DDSPR protocol, the data is forwarded in a unicast hop-by-hop manner, so there are no redundant data packets, and the energy consumption of nodes is relatively small. Therefore, DDSPR is superior to DBR in terms of energy consumption. It can be seen from FIG. 8 that the "hold time" technology is adopted to reduce redundant data packets in the DBR protocol, which in turn brings a great delay. In the DDSPR protocol, the received data packet is forwarded immediately after the routing is completed. Therefore, the DDSPR protocol has a relatively short delay, which is basically equal to the propagation delay. In summary, the DDSPR is suitable for the UANs with high topology dynamics, long time extension, and energy limitation.

Embodiment 5

Figure 9:
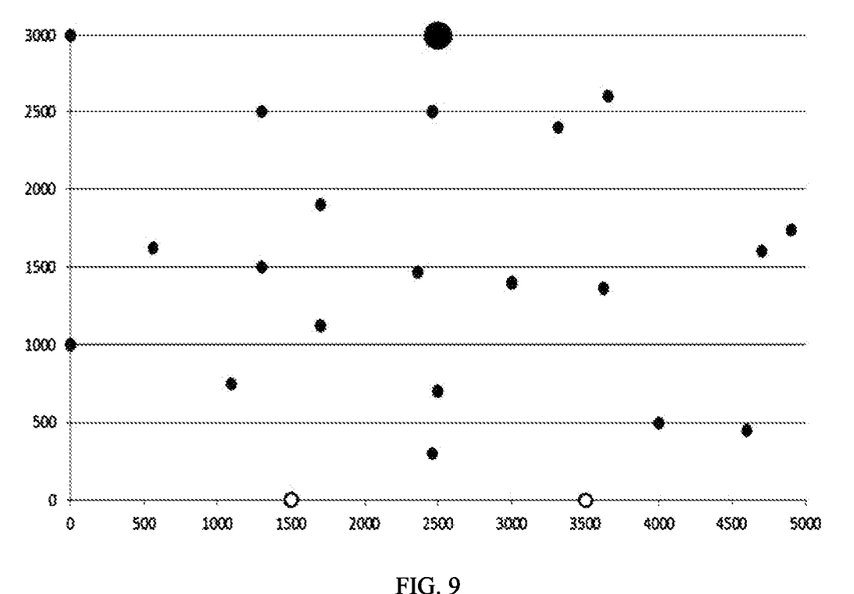
FIG. 9 is a schematic diagram of a topology with multiple data sources according to an embodiment of the present disclosure.

The embodiment provides a performance comparison experiment of a depth and distance-based single-path routing method respectively in the cases of a multiple data source node and a single data source node. The experiment is performed in a 3D area of 5000 m×5000 m×3000 m, in which the nodes with a certain number such as 20, 25, 30, 35, 40, 45 and 50 are randomly distributed. The experimental topology of multiple data sources is shown in FIG. 9, where the thick black dot refers to sink node; the circles refer to data source nodes, and the other dots refer to the randomly-distributed underwater nodes.

Figure 10:
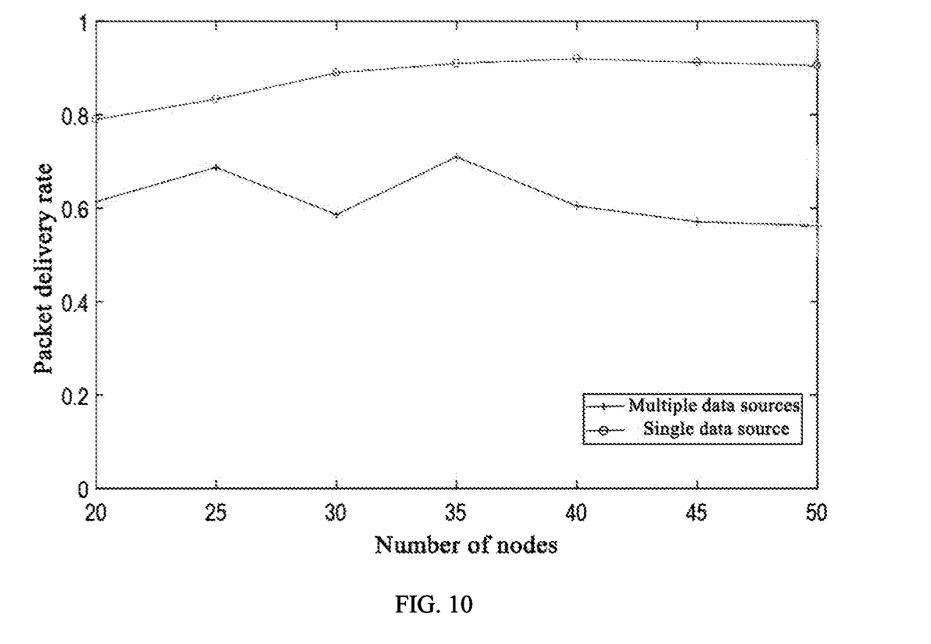
FIG. 10 shows change trends of packet delivery rates of a node with multiple data sources and a node with a single data source with the number of nodes according to an embodiment of the present disclosure.
Figure 11:
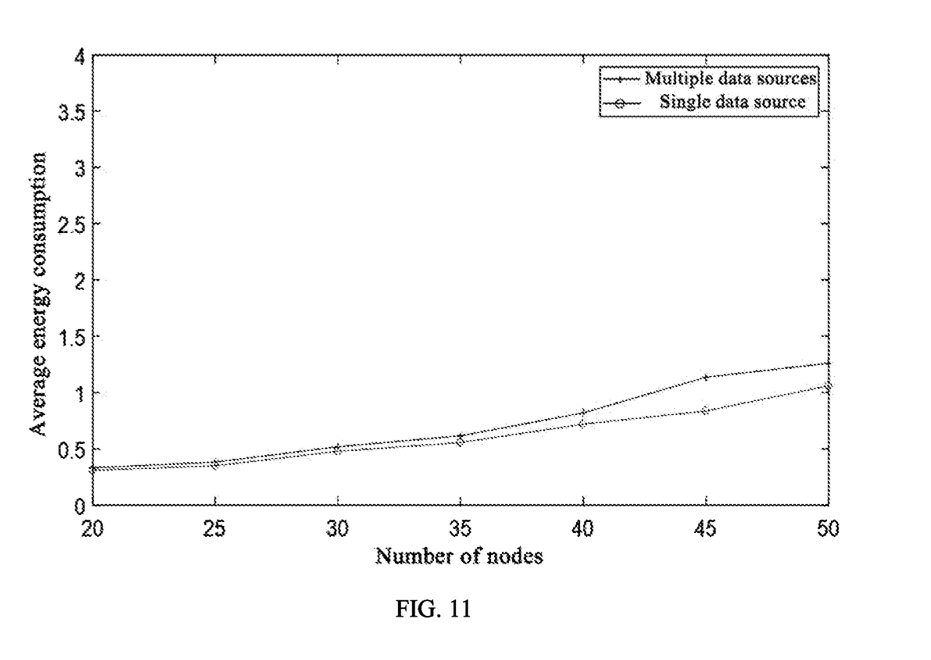
FIG. 11 shows change trends of average energy consumption of network of the node with multiple data sources and the node with a single data source with the number of nodes according to an embodiment of the present disclosure.

As shown in FIGS. 10-11, when there are multiple data sources in the network for data transmission, the collisions in the network will increase with the increase of data packets to be forwarded. Even if the packet delivery rate in multiple data sources is lower than that in a single data source, the DDSPR protocol can still maintain a high data transmission rate with a packet delivery rate of 60%-70%. In addition, the use of multiple data sources will lead to a certain increase in the average energy consumption of nodes, but the increase is not obvious. In summary, when there are multiple data sources, the DDSPR protocol can still complete the data transmission well without significant increase in the average energy consumption of nodes.

Embodiment 6

The embodiment provides an experiment to verify the influence of node mobility on the performance of the DDSPR protocol, in which the packet delivery rate and the average energy consumption of the DDSPR protocol respectively in the cases that the nodes are mobile and the nodes are stationary are compared. The experiment is performed in a 3D area of 5000 m×5000 m×3000 m, in which the nodes with a certain number such as 20, 25, 30, 35, 40, 45 and 50 are randomly distributed. All sensor nodes, except for the sink nodes, move with the water flow with random direction and speed. Considering that the underwater devices such as Autonomous Underwater Vehicle (AUV) generally move at a speed of about 1 m/s-3 m/s, the traveling speed of the node is set to be no more than 3 m/s.

Figure 12:
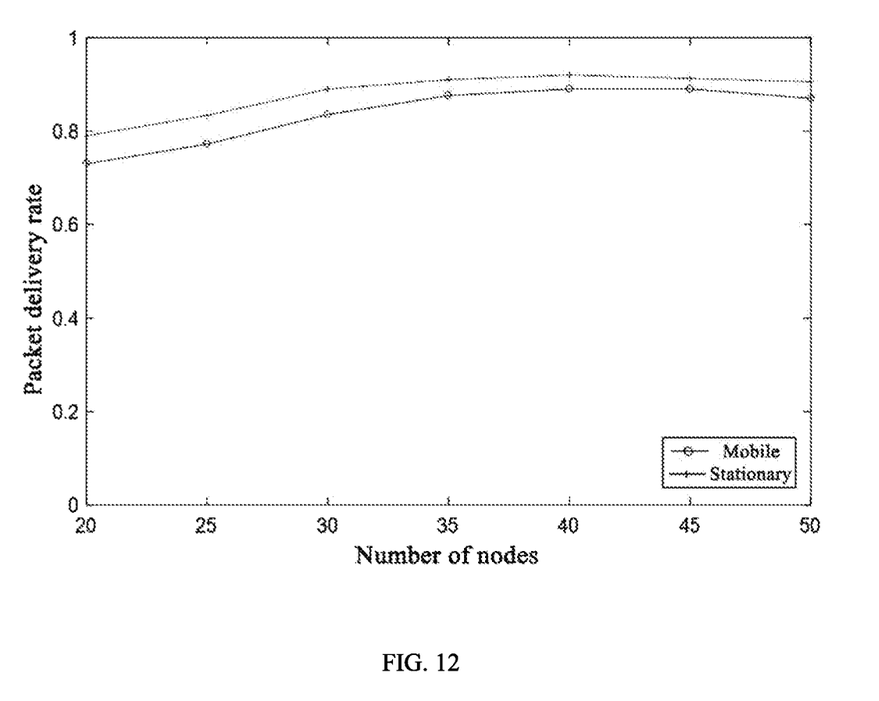
FIG. 12 shows change trends of packet delivery rates of a mobile node and a stationary node with the number of nodes according to an embodiment of the present disclosure.
Figure 13:
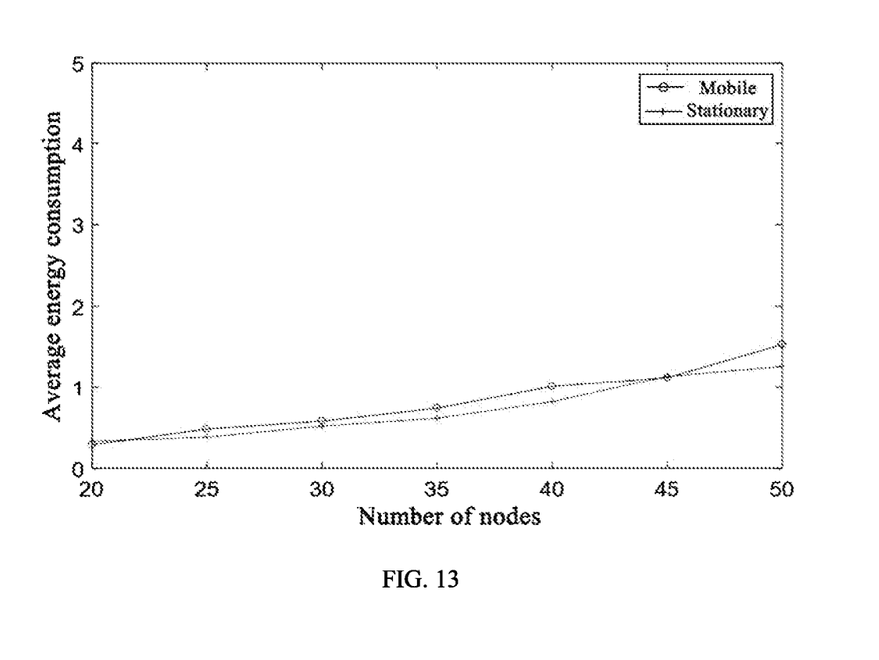
FIG. 13 shows change trends of average energy consumption of the mobile node and the stationary node with the number of nodes according to an embodiment of the present disclosure.

As shown in FIG. 12, when the network topology is sparse, the node mobility will have a great impact on the network topology, which may even cause the failure of some nodes in the network in routing, thereby affecting the packet delivery rate of the DDSPR protocol to some extent. In the case of a dense network topology, the impact of node mobility on the network topology is reduced, and the packet delivery rate of the DDSPR protocol in the case that the nodes are mobile is basically close to that in the case that the nodes are stationary. FIG. 13 shows a change trend of average energy consumption in the network respectively in the cases that the nodes are mobile and the nodes are stationary. It can be seen from the figure that the average energy consumption generated in the case that the node moves is higher than that generated in the case that the node keeps stationary, but the overall difference is relatively small. Based on FIGS. 12-13, it can be seen that the movement of nodes has little impact on the performance of the DDSPR protocol, and thus the DDSPR protocol is suitable for the UANs with dynamic topology changes.

Compared to the prior art, the present disclosure has the following beneficial effects.

In the depth and distance-based single-path routing method (DDSPR) provided herein, the data packets in the UANs are divided into downlink control frames (the control frames arriving at a specified ID and the control frames arriving at a specified location), uplink data frames and uplink Location frames. After the network initialization is completed, the uplink Location frame is flooded and forwarded, and finally a location table of nodes in the entire network is generated at the sink node. After the location table is generated, the update mechanism of the uplink Location frames is switched to a unicast triggering update mechanism. For the downlink control frames arriving at the specified ID, the location of a node with the specified ID is obtained through the location table, thereby realizing the same unicast forwarding as the downlink control frame arriving at the specified location. For the uplink data frames, the unicast forwarding is performed based on the depth, level, energy and other information of the node. Some simulation experiments for the DDLC protocol have been conducted in scenarios, for example, there is single data source or multiple data sources; and the nodes are stationary or mobile. It can be seen from the results that in the case of multiple data sources, the packet delivery rate of the DDSPR protocol can still be maintained at 60%-70% with slight change in the average energy consumption of nodes. In addition, the node mobility has a small impact on the performance of the DDSPR protocol, so that the DDSPR protocol is suitable for the UANs with dynamical topology changes. The DDSPR protocol reduces the collisions in the network, the energy consumption of node and the average end-to-end delay, and improves the packet delivery rate, extending the network life cycle.

Described above are only preferred embodiments of the present disclosure. It should be understood that any improvement and modification made by those skilled in the art without departing from the spirit of the present disclosure shall fall within the scope of the disclosure defined by the appended claims.

What is claimed is:

1. A depth and distance-based single-path routing method, comprising:
   (1) after initialization is completed, gathering location information of nodes in network to a sink node through the flooding of an uplink Location frame; storing the location information at the sink node to generate a location table of whole-network nodes via the sink node; after the location table is generated, switching an update mechanism of the uplink Location frame to an unicast triggering update mechanism to execute a depth and energy-based uplink routing algorithm;
   (2) receiving, by the sink node, a downlink control packet arriving at a specified ID;
   (3) for the downlink control packet arriving at the specified ID, obtaining, by the sink node, location information of a node at the specified ID through the location table, to execute a distance and energy-based downlink routing policy; and
   (4) executing the distance and energy-based downlink routing policy for a downlink control packet arriving at a specified location and the downlink control packet arriving at the specified ID; and executing a routing recovery algorithm when a void area occurs.

2. The depth and distance-based single-path routing method of claim 1, wherein the location table is generated through steps of:
   flooding, by an end node, a Location frame containing location information of the end node to generate the location table in the sink node.

3. The depth and distance-based single-path routing method of claim 1, wherein the unicast triggering update mechanism of the uplink Location frame comprises:
   introducing, by an algorithm, a topology variation degree $P_{location}$ for each node; triggering the updating of the uplink Location frame when the topology variation degree $P_{location}$ exceeds a threshold; and forwarding the uplink Location frame hop-by-hop by a unicast method;
   wherein
   the topology variation degree $P_{location}$ is calculated as follows:

$$P_{location} = \left|1 - \frac{Density_{cur}}{Density_{init}}\right| + \left(1 - \frac{Density_{remain}}{Density_{init}}\right);$$

wherein $Density_{init}$ is a neighbor density of a first node after the last update; $Density_{cur}$ is a neighbor density of the first node before the current update; $Density_{remain}$ is a neighbor density of a second node whose ID does not change in a period between the last update and the current update; the smaller the $P_{location}$ is, the smaller the topology variation is;
   a threshold $\partial$ is set for $P_{location}$ in the depth and distance-based single-path routing method, and if $P_{location} \leq \partial$ or $Dis_{locat} < R$, the update of the uplink Location frame is not triggered; if $P_{location} > \partial$ and $Dis_{locat} \geq R$, the update of the uplink Location frame update is triggered;

wherein $Dis_{local}$ is a traveling distance of the first node in the period between the last update and the current update.

4. The depth and distance-based single-path routing method of claim 1, wherein the step of executing the distance and energy-based downlink routing policy comprises:

receiving, by the sink node, a downlink control frame comprising a downlink control packet arriving at a location and a downlink control packet arriving at an ID; calculating a forwarding factor respectively using all candidate nodes as a forwarding node according to:

$$\alpha_{kid}^j = k_1 \frac{Dis_{cur} - Dis_i}{R} + k_2 \frac{AP_i}{\max\{AP_i\}};$$

and selecting a node with the largest forwarding factor as the optimal forwarding node;

wherein $k_1$, $k_2$ are weight coefficients, $k_1+k_2=1$ and $k_1<k_2$; $Dis_i$ is a distance from a child node $node_i$ to a destination node; $Dis_{cur}$ is a distance from a current node $node_{cur}$ to the destination node; $AP_i$ is a current remaining energy value of the child node $node_i$; $AP_{init}$ is an initial energy value of the child node; a node, which is closer to the destination node and has higher remaining energy, has greater forwarding probability, so that a node with the largest forwarding factor $\alpha_{kid}^i=\max\{\alpha_{kid}^i\}$ is selected as a node for the next hop to perform forwarding.

5. The depth and distance-based single-path routing method of claim 1, wherein the step of executing the routing recovery algorithm comprises:

selecting a neighbor node that has a level equal to a level of a current node as a candidate node $node_i$ when the void area occurs; and based on energy of each candidate node and a distance between each candidate node and a destination location, calculating an expectation factor $\alpha_{Neb}^i$ for each candidate node according to:

$$\alpha_{Neb}^j = \frac{\max\{Dis_i\} - Dis_i}{2R} + \frac{AP_i}{\sum AP_i};$$

wherein $Dis_i$ is the distance between the candidate node and the destination location; R is a transmission radius; $AP_i$ is a remaining energy value of the candidate node $node_i$; a candidate node, which is closer to the destination location and has higher remaining energy, has greater expectation factor; in the routing recovery algorithm, a candidate node with the largest expectation factor $\alpha_{Neb}^i=\max\{\alpha_{Neb}^i\}$ is selected as the optimal forwarding node to which a downlink control frame is forwarded, and the downlink routing algorithm is continued by the candidate node with the largest expectation factor; in addition, in order to reduce unnecessary energy consumption, it is specified in the routing recovery algorithm that if it fails to reach a destination location after the forwarding is performed twice at the same level, the destination location is considered as an unreachable area and the forwarding of the downlink control frame is ended.

6. The depth and distance-based single-path routing method of claim 1, wherein the depth and energy-based uplink routing algorithm is executed as follows:

for an uplink data frame and the uplink Location frame, calculating a forwarding overhead of each candidate node based on depth and remaining energy according to the following formula:

$$\alpha_{depth}^j = \alpha_1 \frac{Dep_i - \min\{Dep_i\}}{\max\{Dep_i\} - \min\{Dep_i\}} + \alpha_2 \frac{AP_{init} - AP_i}{AP_{init}};$$

selecting, by considering energy consumption and collision of nodes, an optimal candidate node for next hop; wherein $\alpha_1$, $\alpha_2$ are weight coefficients, and $\alpha_2=1-\alpha_1$; $Dep_i$ is a depth of the candidate node; $AP_i$ is a remaining energy value of the candidate node; $AP_{init}$ is an initial energy value of the candidate node; a node, which has smaller depth and more remaining energy, has smaller forwarding overhead, and thus in the depth and energy-based uplink routing algorithm, a candidate node with the minimum forwarding overhead $\alpha_{depth}^i=\min\{\alpha_{depth}^i\}$ is selected as the optimal node for the next hop; therefore, a parent node with depth greater than the current node is allowed to be adopted for the next hop.

* * * * *